(12) United States Patent
Baaijens et al.

(10) Patent No.: US 9,939,588 B2
(45) Date of Patent: Apr. 10, 2018

(54) INTERCONNECTING OPTICAL FIBERS AT A HYDROCARBON FLUID PRODUCTION FACILITY

(71) Applicants: SHELL INTERNATIONALE RESEARCH MAATSCHAPPIJ B.V., The Hague (NL); SHELL OIL COMPANY, Houston, TX (US)

(72) Inventors: Matheus Norbertus Baaijens, Rijswijk (NL); William Birch, Aberdeen (GB); Arthur Alexander Van Rooyen, Rijswijk (NL)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 15/323,570

(22) PCT Filed: Jul. 3, 2015

(86) PCT No.: PCT/EP2015/065187
§ 371 (c)(1),
(2) Date: Jan. 3, 2017

(87) PCT Pub. No.: WO2016/005280
PCT Pub. Date: Jan. 14, 2016

(65) Prior Publication Data
US 2017/0139147 A1    May 18, 2017

(30) Foreign Application Priority Data
Jul. 7, 2014    (EP) ..................... 14175937

(51) Int. Cl.
*G02B 6/32* (2006.01)
*E21B 17/02* (2006.01)
(Continued)

(52) U.S. Cl.
CPC .............. *G02B 6/325* (2013.01); *E21B 17/02* (2013.01); *E21B 33/04* (2013.01); *E21B 33/12* (2013.01)

(58) Field of Classification Search
None
See application file for complete search history.

(56) References Cited

U.S. PATENT DOCUMENTS 4,090,572 A * 5/1978 Welch ................ B23K 26/1476
175/16
4,360,249 A * 11/1982 Slemon .................... G02B 6/32
385/138

(Continued)

FOREIGN PATENT DOCUMENTS

DE      10261108 A1 *  7/2004
GB      2509052         6/2014

*Primary Examiner* — Mike Stahl

(57) ABSTRACT

A cost efficient and pressure resistant system for interconnecting fiber optical cables in-situ at a hydrocarbon fluid production facility comprises:—a pressure resistant light transparent window (41);—a first lens system (48A-C), which is arranged at one side of the window and configured to convert a first light beam transmitted through a first fiber optical cable (46A-C) into a collimated light beam (51A-C) that is transmitted through the window; and—a second lens system (50A-C), which is arranged at an opposite side of the window and configured to receive and reconvert the collimated light beam into a second light beam that is transmitted into a second fiber optical cable (47A-C).

12 Claims, 3 Drawing Sheets

(51) Int. Cl.
*E21B 33/04* (2006.01)
*E21B 33/12* (2006.01)

(56) References Cited

U.S. PATENT DOCUMENTS

| | | | | |
|---|---|---|---|---|
| 4,666,242 | A | * | 5/1987 | Cairns .................. G02B 6/3816 385/69 |
| 4,682,846 | A | * | 7/1987 | Cowen ..................... G02B 6/32 385/138 |
| 4,759,601 | A | | 7/1988 | Knutsen et al. |
| 4,994,671 | A | | 2/1991 | Safinya et al. |
| 2009/0232454 | A1 | * | 9/2009 | Takahashi ............ G02B 6/3897 385/54 |
| 2010/0265492 | A1 | * | 10/2010 | Schroeder ................. G01J 3/02 356/51 |
| 2013/0192851 | A1 | | 8/2013 | Algeroy et al. |

* cited by examiner

INTERCONNECTING OPTICAL FIBERS AT A HYDROCARBON FLUID PRODUCTION FACILITY

CROSS-REFERENCE TO RELATED APPLICATIONS

The present application is a National Stage (§ 371) application of PCT/EP2015/065187, filed Jul. 3, 2015, which claims the benefit of European Application No. 14175937.3, filed Jul. 7, 2014, which is incorporated herein by reference in its entirety.

FIELD OF THE INVENTION

The invention relates to a system and method for interconnecting optical fibers at a hydrocarbon fluid production facility, such as at a crude oil, natural gas and/or other hydrocarbon fluid production well.

BACKGROUND OF THE INVENTION

Conventional methods to interconnect Fiber-Optic (FO) cables for well applications involve splicing or use of FO-connectors.

In a splice, adjacent ends of fiber are aligned and fused together. A good splice does not show significant signal loss, typically <0.01 dB, or distortion. However, splicing is difficult to deploy and is therefore not available for use in oilfield applications.

In a FO connector, the fiber is glued in a ceramic ferrule. The intermeshing connector sections then align and center these ferrules, i.e. the ends of the fibers, against each other. Such connections show some signal loss and distortion. In a good FO-connection this loss is of the order of 0.1 dB.

It is known to in-situ interconnect optical fibers in a well by wet-connectable FO connectors, which have to center and align the cores of the interconnected optical fibers, which cores may have a diameter of only 10 micrometer.

The problem of interconnecting optical fibers downhole or at wellhead assemblies has until now been solved by mating intermeshing connector assemblies with extreme (micrometer) precision at similarly extreme costs.

Installation of fiber optical sensing and/or communication systems in oil and/or gas production wells may generate leakage paths since the fiber optical cables and/or connectors will penetrate pressure barriers, such as downhole packers, the cement sheath surrounding the well casing, the tubing hanger near the wellhead and the wellhead assembly itself.

Another problem associated with installation of optical sensing and/or communication systems in oil and/or gas production wells in which the downhole pressure may be several hundred Bar, is that optical fibers cannot sustain significant shear forces. Therefore conventional fiber optic penetrators for pressure barriers are multicomponent and comprise several materials, including degradation prone elastomers. The long-term mechanical behavior of such a multicomponent system is doubtful.

U.S. Pat. No. 4,994,671 discloses a production logging tool for analyzing the composition of formation fluids in a downhole test chamber in which a light source emits near infrared rays via collimation or fiber optics. The collimation means may comprise a collimating mirror, a first fiber optic bundle for directing the near infrared rays to a substantially transparent window of the test chamber and a second fiber optic bundle for directing light reflected by the formation fluid to a spectrometer for detecting the composition of the formation fluid.

In the known production logging tool the first and second fiber optic bundles are arranged in the test chamber at the same side of the light transparent window.

There is a need for an improved and cost efficient system and method for interconnecting fiber optical cables in wells or other hydrocarbon fluid production facilities, which permits interconnection of fiber optical cables that are arranged at opposite sides of a pressure resistant light transparent window.

SUMMARY OF THE INVENTION

In accordance with a first aspect of the invention there is provided a system for optically interconnecting fiber optical cables at a hydrocarbon fluid production facility, the system comprising:
  a window made of a pressure resistant light transparent material arranged in the hydrocarbon fluid production facility;
  a first lens system arranged at one side of the window, which first lens system is connected to a first fiber optical cable and configured to convert a first light beam transmitted through the first fiber optical cable into a collimated light beam that is transmitted through the window; and
  a second lens system ed at an opposite side of the window, which second lens system is configured to receive the collimated light beam and reconvert it into a second light beam that is transmitted into a second fiber optical cable that is connected to the second lens.

In accordance with another aspect of the invention there is further provided a method for optically interconnecting fiber optical cables at a hydrocarbon fluid production facility, the method comprising:
  providing the hydrocarbon fluid production facility with a window made of a pressure resistant light transparent material;
  arranging at one side of the window a first lens system, which is connected to a first fiber optical cable;
  arranging at an opposite side of the window a second lens system, which is connected to a second fiber optical cable;
  inducing the first lens system to convert a light beam transmitted through the first fiber optical cable into a collimated light beam that is transmitted through the window; and
  inducing the second lens system to receive the collimated light beam and reconvert it into a light beam that is transmitted into the second fiber optical cable.

These and other features, embodiments and advantages of the method and/or system according to the invention are described in the accompanying claims, abstract and the following detailed description of non-limiting embodiments depicted in the accompanying drawings, in which description reference numerals are used which refer to corresponding reference numerals that are depicted in the drawings.

Similar reference numerals in different figures denote the same or similar objects.

DETAILED DESCRIPTION OF THE DEPICTED EMBODIMENTS

The present disclosure involves a collimated optical coupler comprising:
- a window made of a pressure resistant light transparent material;
- a first lens system arranged at one side of the window, which first lens system is connected to a first fiber optical cable and configured to convert a first light beam transmitted through the first fiber optical cable into a collimated light beam that is transmitted through the window; and
- a second lens system arranged at an opposite side of the window, which second lens system is configured to receive the collimated light beam and reconvert it into a second light beam that is transmitted into a second fiber optical cable that is connected to the second lens.

The window thus is a pressure resistant light transparent window, capable of allowing passage of light between the first and second fiber optical cables through a pressure barrier.

The pressure resistant light transparent window may be made of glass and be sealingly arranged in and penetrating a pressure barrier in a wall of the hydrocarbon fluid facility, which may be configured to resist a pressure difference of 100 Bar and optionally of 1000 Bar to prevent leakage of hydrocarbon fluid to the environment.

The hydrocarbon fluid production facility may be a hydrocarbon fluid production well traversing a pressurized hydrocarbon fluid containing formation and a plurality of pressure resistant light transparent windows may be arranged at several locations in the well, such as in the wellhead, a tubing hanger, and downhole below the tubing hanger, wherein the pressure resistant windows in the wellhead and tubing hanger may have a smaller width than at least one pressure resistant window downhole in the well.

Figure 1:
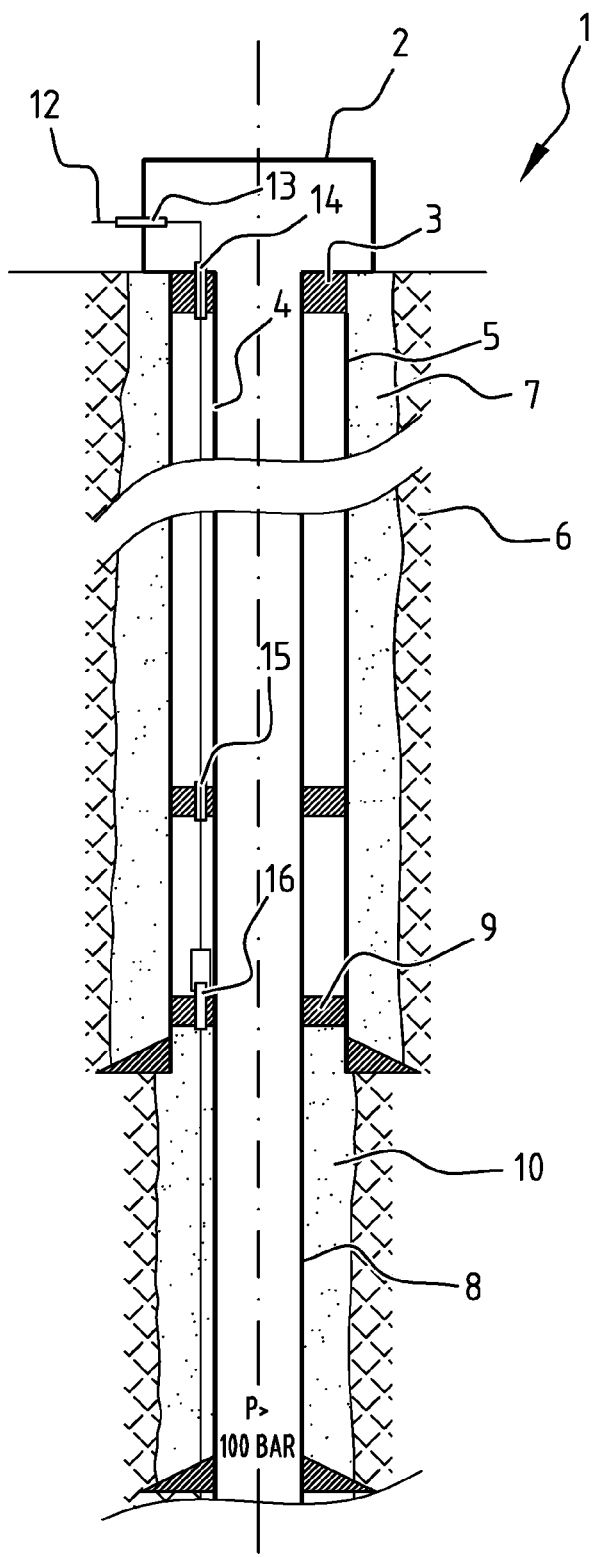
FIG. 1 is a schematic longitudinal sectional view of a well with fiber optical cables interconnected by pressure resistant collimated couplers.

FIG. 1 shows a hydrocarbon fluid production well 1 comprising a wellhead 2 with a tubing hanger 3 from which a production tubing 4 is suspended.

The wellhead 2 is sealingly connected to an upper casing section 5 that is sealingly secured within the surrounding formation 6 by a cement sheath 7. A lower casing section 8 is suspended from the upper casing section 5 by means of a packer 9 and is also sealingly secured within the surrounding formation by a cement sheath 10. A lower section of the production tubing 4 is sealingly secured to the surrounding upper casing section by another packer 11.

Below the lower casing section 8 the well 1 comprises a permeable hydrocarbon fluid inflow zone (not shown) in which the pressure may exceed 100 Bar. The well 1 is equipped with a fiber optical sensing and/or communication assembly 12 comprising a series of pressure resistant collimated optical couplers 13, 14, 15 and 16 according to the invention that are shown in, and will be described in more detail with reference to, FIGS. 3 and 4. It is observed that the depicted optical coupler 16 is an example of a collimated coupler used in a wet connect system.

Figure 2:
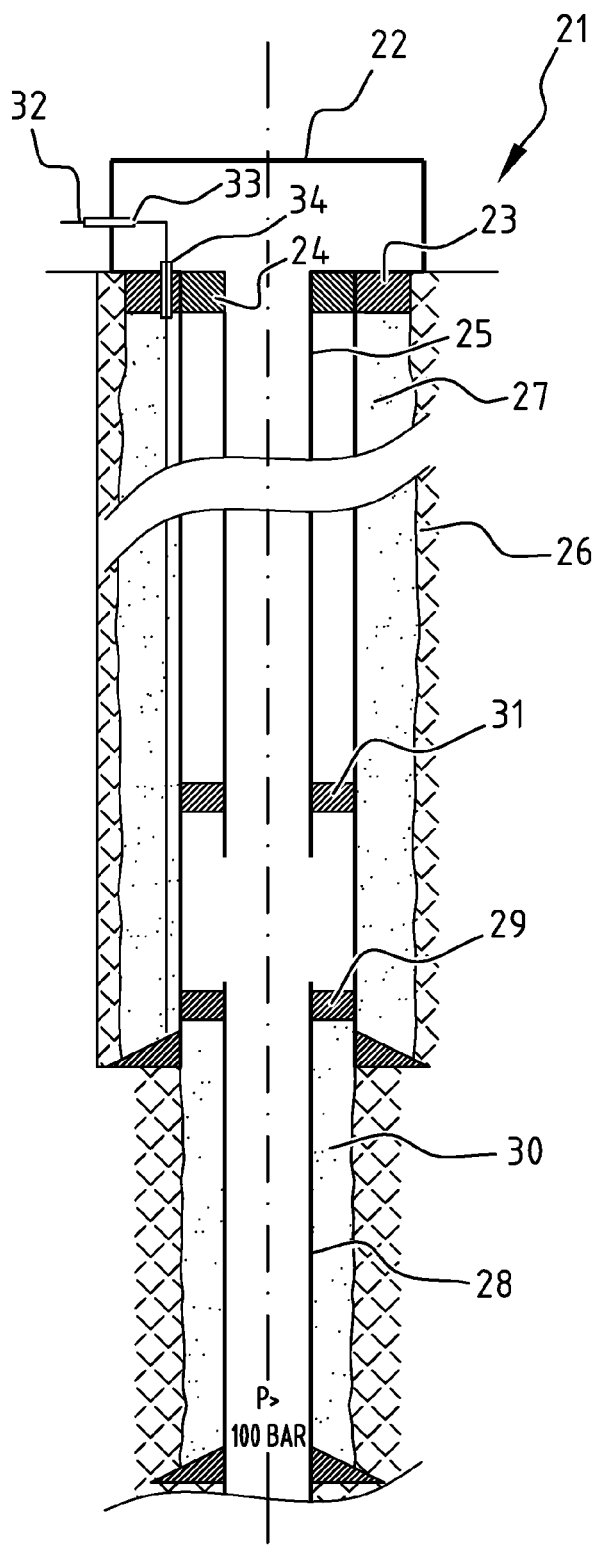
FIG. 2 is a schematic longitudinal sectional view of another well with fiber optical cables interconnected by pressure resistant collimated couplers.

FIG. 2 shows another hydrocarbon fluid production well 21 comprising a wellhead 22 with a tubing hanger 23 from which a production tubing 24 is suspended. The wellhead 22 is sealingly connected to an upper casing section 25 that is sealingly secured within the surrounding formation 26 by a cement sheath 27. A lower casing section 28 is suspended from the upper casing section 25 by means of a packer 29 and is also sealingly secured within the surrounding formation by a cement sheath 30. A lower section of the production tubing 24 is sealingly secured to the surrounding upper casing section 25 by another packer 31.

Below the lower casing section 28 the well 21 comprises a permeable hydrocarbon fluid inflow zone (not shown) in which the pressure may exceed 100 Bar. The well 21 is equipped with a fiber optical sensing and/or communication assembly 32 comprising a series of pressure resistant collimated optical couplers 33 and 34 according to the invention that are shown in, and will be described in more detail with reference to, FIGS. 3 and 4. In the well 21 shown in FIG. 2 the fiber optical cable assembly 12 is embedded in the cement sheath 27 surrounding the upper casing section 27, whereas in the well 1 shown in FIG. 1 an upper part of the fiber optical assembly 12 is arranged in the annulus between the upper casing section 5 and the production tubing 4, whilst a lower part of the fiber optical assembly 12 is arranged within the cement sheath 10 surrounding the lower casing section 8.

The collimated optical coupler can be assembled by:
- providing a window made of a pressure resistant light transparent material;
- arranging at one side of the window a first lens system, which is connected to a first fiber optical cable;
- arranging at an opposite side of the window a second lens system, which is connected to a second fiber optical cable;
- inducing the first lens system to convert a light beam transmitted through the first fiber optical cable into a collimated light beam that is transmitted through the window; and
- inducing the second lens system to receive the collimated light beam and reconvert it into a light beam that is transmitted into the second fiber optical cable.

These steps may be repeated to form a series of the collimated optical couplers. These may be arranged in the wellhead, in the tubing hanger and downhole in the well below the tubing hanger, whereby the windows in the wellhead and the tubing hanger each have a smaller width than the window downhole in the well below the tubing hanger.

Figure 3:
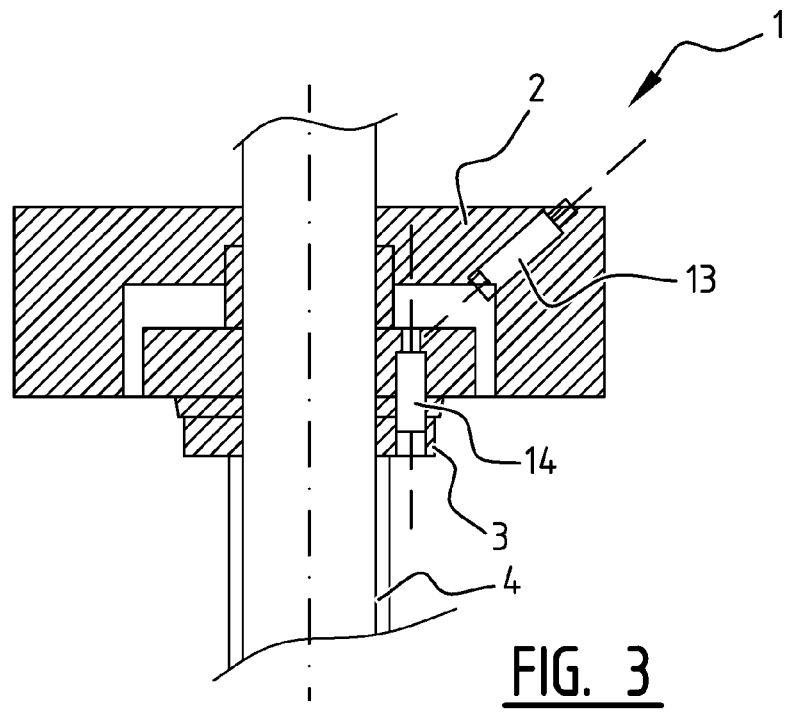
FIG. 3 is a schematic longitudinal sectional view of a wellhead comprising fiber optical cables interconnected by pressure resistant collimated couplers.

FIG. 3 shows in more detail how the fiber optical cable assembly 12 shown in FIG. 1 is equipped with collimated couplers 13 and 14 that penetrate through the wellhead 2 and tubing hanger 3.

Figure 4:
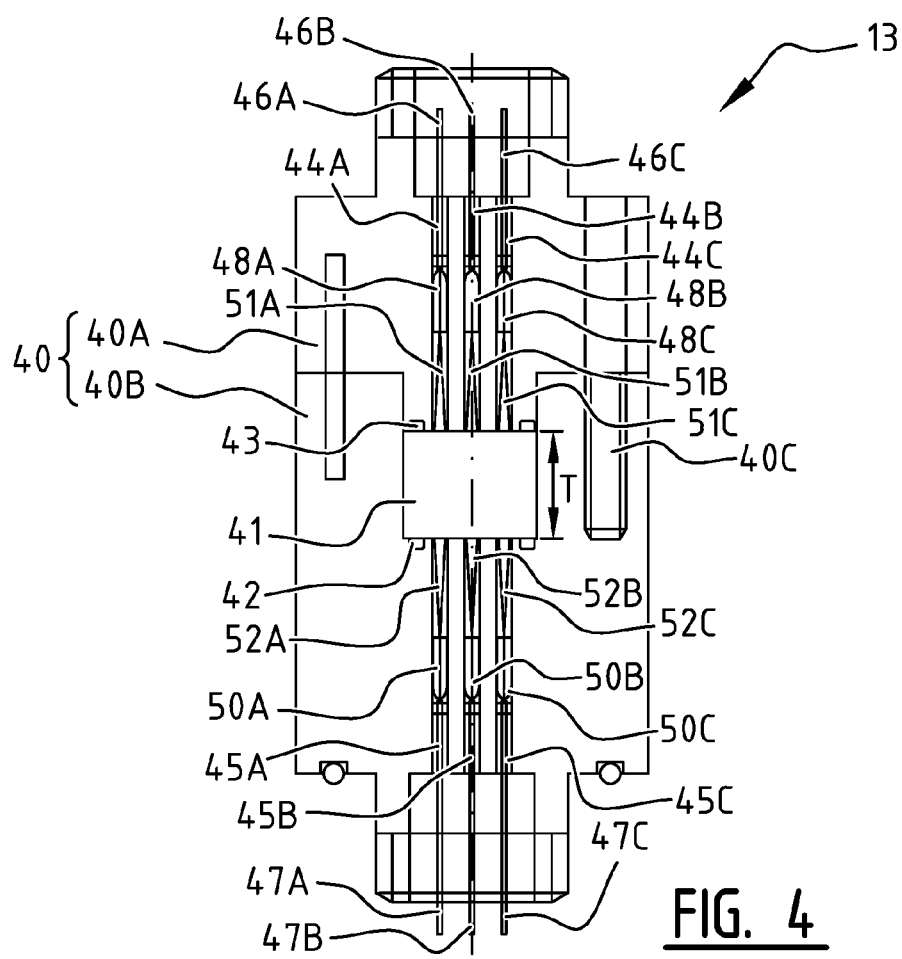
FIG. 4 is a schematic longitudinal sectional view of a pressure resistant collimated coupler.

FIG. 4 shows in further detail the collimated coupler 13 shown in FIGS. 1 and 3. The coupler 13 comprises cylindrical steel housing 40 with intermeshing upper and lower housing sections 40A and 40B that are screwed together by screws 40C.

A light transparent glass window 41 is sealing secured between the upper and lower housing sections 40A and 40B by means of a pair of O-rings 42 and 43. The glass window 41 has a thickness T which is sufficient to withstand a pressure difference of at least 100 Bar to prevent that pressurized well effluents escape into the environment via the coupler 13.

The upper and lower housing sections 40A and 40B each comprise a set of three cylindrical holes 44A-C and 45A-C in which first and second fiber optical cable sets 46A-C and 47A-C and associated first and second collimation lens systems 48A-C and 50A-C are arranged.

It is observed that the lens systems 48A-C and 50A-C and the window 41 may comprise mirrors and/or prisms.

The first lens systems 48A-C are each configured to convert light beams transmitted through the first fiber optical cable sections 46A-C into collimated collinear light beams 51A-C, which are transmitted through the pressure resistant light transparent glass window 41 to the second lens systems 50A-C, which are configured to reconvert the collimated light beams into a de-collimated light beams 52A-C that are transmitted into the second fiber optical cable sets 47A-C and vice versa. In other words the system shown in FIG. 4 for optically interconnecting fiber optical cables 46A-C, 47A-C in a hydrocarbon fluid production facility 1 comprises:
- a pressure resistant light transparent window 1;
- a first lens system set 48A-C, which is arranged at one side of the window 41 and configured to convert a first light beam transmitted through a first fiber optical cable set 46A-C into a collimated light beam 51A-C that is transmitted through the window 41; and
- a second lens system set 50A-C, which is arranged at an opposite side of the window 41 and configured to receive and reconvert the collimated light beam 51A-C into a second light beam 52A-C that is transmitted into a second fiber optical cable 47A-C.

It is observed that the system according to the invention may provide downhole optic signal transfer through a pressure resistant glass window 41 that is sealed within a pressure barrier and the use of prisms, lenses, 'grin'-lenses, (parabolic) mirrors and/or other lens systems to form a collimated optic signal coupling across the window 41. Such systems are currently solely available for use in a air or another controlled environment. The novelty is in using these systems in less controlled environment, such as downhole and/or at a wellhead or tubing hanger of a hydrocarbon fluid production facility for in-situ connection of one or more fiber optical cables.

For a downhole wet-connectable system, a larger size of the window 41 will reduce the problems with dirt/sand disrupting the signal transfer. A small window 41, on the other hand, would be used to transfer a signal through a pressure barrier in a penetrator application.

The collimated signal transfer system according to the inventions basically involves divergence of the optical signal to a diameter that can be handled better, followed by collimation of the signal, using lenses 48A-C or mirrors, in a collinear beam. Some distance away, this beam is focused, again using lens system sets 50A-C or mirrors and inserted in the next fiber 47A-C.

The losses and distortion associated with such a dual-collimator system may be significant. However, there are two applications for which these disadvantages are balanced by advantages:
I. Signal transfer through a pressure barrier; and
II. Wet-connects.

The dual-collimator system provides a credible long-term pressure barrier using a small glass window in a penetrator for a high pressure differential.

Aligning and centering the cores of two fibers (10 micrometer diameter) at the bottom of the sea or deep in a well with an accuracy that is better than 1 micrometer is difficult. To do so in an uncontrolled fluid environment where one grain of sand is able to fail the connection seems a bit extreme.

Collimation of the signal to a diameter of e.g. 10 mm and transfer through two windows that are positioned opposite each other with an accuracy of 1 mm is entirely feasible and the effects of a few grains of sand should be negligible.

It is obvious that by using this collimated optical equipment signal loss and distortion will be incurred. There are two mitigating observations:
I. Signal loss in collimated signal transfer is advertised as approximately 0.2 dB in existing applications of this method. This is achieved with low-cost optical equipment. The expectation is that this performance can be improved upon.
II. In general, it is better to transfer the problem out of the well (1). In this case the answer is to compensate the losses by transmitting a more powerful light signal using a more powerful light-box.

There are currently three collimation methods in use for fiber optics.
I. Systems using normal optical lenses;
II. Systems using a larger diameter graded index cylinder, which are known as Grin-lenses; and
III. Systems using (parabolic) mirrors.

These systems are available in several sizes for example from ThorLabs.

Light diverges from an open-end fiber at a given angle (specific for that medium). The distance of the collimation lens—or mirror system from the open end determines the diameter of the collinear beam that leaves the collimator. A similar reasoning applies for the length of a Grin-lens.

It is observed that these currently available lenses are designed to work in air. In future such systems might be specifically designed to work in an optical fluid such as water or completely consist of solids such as glass.

The collinear light leaving the collimator will travel straight through any transparent medium, including the window (41) and clear fluids, as long as its path is perpendicular to any surface.

At the other side of the transparent window (41), a second lens system 50A-C converges the light and injects it in the second fibers 47A-C.

ThorLabs indicates that there are approximately 0.2 dB losses in a 18 mm diameter collimator coupling based on a triplet lens system, using 1550 nm light. For the smaller triplet system with a 6 mm diameter, they report 0.3 dB losses.

It requires verification whether Grin lenses can also be used for a downhole coupling. Losses for a coupling system based on Grin lenses with a diameter of 1.8 mm are not reported by ThorLabs.

Glass fibers 46A-C, 47A-C do not handle shear forces well. For this reason, it is difficult to seal directly on the fibers 46A-C, 47A-C. Commercially available pressure barrier penetrators are often based on:
I. Glass fiber fixed in a glass ferrule using glue
II. This ferrule is then sealed with an elastomer seal in a metal housing. The long term performance of seals with different materials will be difficult to predict.
In well engineering, most seals in the wellhead area are now based on metal-to-metal seal technology. Metal-to-metal seals can be properly designed for an application and do not deteriorate with time and pressure/temperature load cycles.

Collimated signal transfer would require an optical window that is a pressure barrier. Since physical properties of steel and glass are both well known, it is possible to design a reliable glass-to-metal seal.

It is observed that:

I. Signal transfer may require a window with a diameter of no more than 2 mm if Grin lenses can be used. The thickness of this window is optically irrelevant.

II. Shear failure of the glass can be prevented by using glass with an optimized crystal structure.

III. Use of much larger glass windows is quite common in process industry at pressures of up to 100 Bar.

IV. Methods to heat fuse/shrink a glass window in a steel frame are in use as well.

The approach for a downhole wet-connectable collimated coupling would not be too different from the approach described for a penetrator traversing a pressure barrier. Main differences are that:

For a penetrator traversing a pressure barrier, the signal transfer takes place through a window with the smallest possible area, in order to minimize the force on the seal.

For a downhole wet connectable collimated coupling, the signal transfer takes place through a window with the largest feasible area, in order to minimize the sensitivity to dirt.

Axial or non-axial wet-connectable collimated coupling designs may be used in the method and system according to the invention, for example:

I. Optical connection in the same direction as the mechanical connection to provide an axial optical signal transfer.

II. Optical connection perpendicular to the mechanical connection, by using mirrors or prisms which leads to radial signal transfer. This might make the mechanical design simpler.

It will be understood that the method and system according to the invention provide a cost efficient, robust and pressure resistant fiber optical well communication and or sensing assembly that can be installed more easily than conventional slicing and FO connectors that require extremely accurate alignment of the FO connector sections.

The method described herein may be used to interconnect first and second fiber optical cable sets or bundles and may comprise providing a first lens system set that is connected to the first fiber optical cable set or bundle and a providing a second lens system set that is connected to the second fiber optical cable set or bundle.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the scope of the invention as described in the following claims. In addition, it is to be understood that features described herein independently may, in certain embodiments, be combined.

The method may be used in methods to monitor and manage production of hydrocarbon fluid in a well or other hydrocarbon fluid production facility comprising:

optically interconnecting the fiber optical cables as described herein to form an interconnected fiber optical cable assembly;

monitoring production of the hydrocarbon fluid by means of the interconnected fiber optical cable assembly; and inhibiting leakage of the produced hydrocarbon fluid via the interconnected fiber optical cable assembly into the environment.

Alternatively the method according to the invention may be used in methods to monitor and manage production of hydrocarbon fluid in a refinery and/or chemical plant and/or transportation of hydrocarbon fluid in a hydrocarbon fluid transportation pipeline of a hydrocarbon fluid production facility.

Possible variations of the method and system according to the invention include any variation in mode or modulation of the signal. Further refinement of the optical system, e.g. using prisms and mirrors, is expected to lead to further improvement in system dimensions and pressure rating. Improved optical systems are also expected to allow transmission of multiple optical signals through a single collimated coupler.

The invention claimed is:

1. A system for optically interconnecting fiber optical cables in a hydrocarbon fluid production well traversing a pressurized hydrocarbon fluid containing formation, said hydrocarbon fluid production well comprising a wellhead and a tubing hanger, the system comprising a fiber optical cable assembly comprising a collimated optical coupler, which comprises:

a window made of a pressure resistant light transparent material arranged at the hydrocarbon fluid production facility;

a first lens system, which is arranged at one side of the window, connected to a first fiber optical cable and configured to convert a first light beam transmitted through the first fiber optical cable into a collimated light beam that is transmitted through the window; and a second lens system, which is arranged at an opposite side of the window and configured to receive and reconvert the collimated light beam into a second light beam that is transmitted into a second fiber optical cable, which is connected to the second lens system;

wherein the fiber optical cable assembly comprises a series of the collimated optical couplers arranged in the wellhead, in the tubing hanger and downhole in the well below the tubing hanger, and wherein the windows in the wellhead and the tubing hanger each have a smaller width than the window downhole in the well below the tubing hanger.

2. The system of claim 1, wherein the collimated optical coupler is configured to interconnect a set of first and second fiber optical cables and comprises a set of first lens systems that are connected to the set of first fiber optical cables and a set of second lens systems that are connected to the set of second fiber optical cables.

3. The system of claim 1, wherein the window is made of glass and is sealingly arranged in and penetrates a pressure barrier in a wall of the hydrocarbon fluid facility that prevents leakage of hydrocarbon fluid to the environment.

4. The system of claim 3, wherein the pressure barrier is configured to resist a pressure difference of at least 100 Bar.

5. The system of claim 4, wherein the pressure barrier is configured to resist a pressure difference of at least 1000 Bar.

6. The system of claim 1, wherein the window is arranged in the wellhead of the well.

7. A system for optically interconnecting fiber optical cables in a hydrocarbon fluid production well traversing a pressurized hydrocarbon fluid containing formation, said hydrocarbon fluid production well comprising a wellhead and a tubing hanger, the system comprising a fiber optical cable assembly comprising a collimated optical coupler, which comprises:
- a window made of a pressure resistant light transparent material arranged at the hydrocarbon fluid production facility;
- a first lens system, which is arranged at one side of the window, connected to a first fiber optical cable and configured to convert a first light beam transmitted through the first fiber optical cable into a collimated light beam that is transmitted through the window; and
- a second lens system, which is arranged at an opposite side of the window and configured to receive and reconvert the collimated light beam into a second light beam that is transmitted into a second fiber optical cable, which is connected to the second lens system, wherein the window is arranged in the tubing hanger within the wellhead of the well.

8. A system for optically interconnecting fiber optical cables in a hydrocarbon fluid production well traversing a pressurized hydrocarbon fluid containing formation, said hydrocarbon fluid production well, the system comprising a fiber optical cable assembly comprising a collimated optical coupler, which comprises:
- a window made of a pressure resistant light transparent material arranged at the hydrocarbon fluid production facility;
- a first lens system, which is arranged at one side of the window, connected to a first fiber optical cable and configured to convert a first light beam transmitted through the first fiber optical cable into a collimated light beam that is transmitted through the window; and
- a second lens system, which is arranged at an opposite side of the window and configured to receive and reconvert the collimated light beam into a second light beam that is transmitted into a second fiber optical cable, which is connected to the second lens system, wherein the window is arranged in a downhole packer or other seal within the well.

9. A method for optically interconnecting fiber optical cables to form a fiber optical cable assembly comprising a collimated optical coupler in a hydrocarbon fluid production well traversing a pressurized hydrocarbon fluid containing formation, said hydrocarbon fluid production well comprising a wellhead and a tubing hanger, the method comprising steps of:
- providing the hydrocarbon fluid production facility with a window made of a pressure resistant light transparent material;
- arranging at one side of the window a first lens system, which is connected to a first fiber optical cable;
- arranging at an opposite side of the window a second lens system, which is connected to a second fiber optical cable;
- using the first lens system to convert a light beam transmitted through the first fiber optical cable into a collimated light beam that is transmitted through the window; and
- using the second lens system to receive the collimated light beam and reconvert it into a light beam that is transmitted into the second fiber optical cable;
- repeating the steps to form a series of the collimated optical couplers; and
- arranging the collimated optical couplers in the wellhead, in the tubing hanger and downhole in the well below the tubing hanger, and wherein the windows in the wellhead and the tubing hanger each have a smaller width than the window downhole in the well below the tubing hanger.

10. The method of claim 9, wherein the method is used to interconnect first and second fiber optical cable sets and comprises providing a set of first lens systems that are connected to the set of first fiber optical cables and a providing a set of second lens systems that are connected to the set of second fiber optical cables.

11. The method of claim 9, wherein window is made of glass and penetrates a pressure barrier that prevents leakage of hydrocarbon fluid to the environment.

12. The method of claim 9, wherein the method is used to inhibit leakage of pressurized well effluents via the fiber optical cable assembly into the environment.

* * * * *